(12) United States Patent
Otsuka

(10) Patent No.: US 12,225,209 B2
(45) Date of Patent: Feb. 11, 2025

(54) TRANSMISSION APPARATUS, TRANSMISSION METHOD, AND PROGRAM

(71) Applicant: SONY INTERACTIVE ENTERTAINMENT INC., Tokyo (JP)

(72) Inventor: Katsushi Otsuka, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 153 days.

(21) Appl. No.: 17/911,052

(22) PCT Filed: Mar. 24, 2021

(86) PCT No.: PCT/JP2021/012313
§ 371 (c)(1),
(2) Date: Sep. 12, 2022

(87) PCT Pub. No.: WO2021/200493
PCT Pub. Date: Oct. 7, 2021

(65) Prior Publication Data
US 2023/0107260 A1 Apr. 6, 2023

(30) Foreign Application Priority Data
Mar. 31, 2020 (JP) ................. 2020-063854

(51) Int. Cl.
H04N 19/159 (2014.01)
H04N 19/166 (2014.01)
H04N 19/176 (2014.01)

(52) U.S. Cl.
CPC ......... H04N 19/166 (2014.11); H04N 19/159 (2014.11); H04N 19/176 (2014.11)

(58) Field of Classification Search
None
See application file for complete search history.

(56) References Cited

U.S. PATENT DOCUMENTS 6,175,551 B1 * 1/2001 Awater ............... H04B 1/707
370/210
6,385,451 B1 * 5/2002 Kalliokulju ........ H04W 36/28
370/332
(Continued)

FOREIGN PATENT DOCUMENTS

CN 101233760 A 7/2008
EP 3448082 A 2/2019
(Continued)

OTHER PUBLICATIONS

International Search Report and Written Opinion mailed Jun. 22, 2021, from PCT/JP2021/012313, 9 sheets.
(Continued)

Primary Examiner — Mohammad J Rahman
(74) Attorney, Agent, or Firm — XSENSUS LLP

(57) ABSTRACT

Provided are a transmission apparatus, a transmission method, and a program that achieve transmission of image data having an appropriate referent with a small network load. An acquisition unit (26) sequentially acquires frame images drawn in a frame buffer. An encoding processing unit (28) sequentially encodes encoding units each corresponding to part or whole of one of the frame images and generates image data. A data transmitting unit (30) sequentially transmits the image data. A transmission failure probability estimating unit (38) estimates, after the transmission of the image data, a transmission failure probability that is a probability of failure of the transmission of the image data. A referent determining unit (42) determines, in reference to the transmission failure probability of the image data, one or a plurality of referents that serve as a referent of a given encoding unit from the encoding units related to the image data transmitted. The encoding processing unit (28) encodes
(Continued)

the given encoding unit by referring to the one or the plurality of referents, thereby generating the image data.

20 Claims, 9 Drawing Sheets

(56) References Cited

U.S. PATENT DOCUMENTS

| | | | | |
|---|---|---|---|---|
| 7,369,675 | B2* | 5/2008 | Pelly | H04N 1/32165 |
| | | | | 705/57 |
| 7,738,481 | B2* | 6/2010 | Igarashi | H04W 72/1221 |
| | | | | 370/395.42 |
| 8,705,613 | B2* | 4/2014 | Chou | H04N 19/619 |
| | | | | 375/240.01 |
| 10,116,970 | B1* | 10/2018 | Banerjee | H04N 21/2343 |
| 2002/0094028 | A1 | 7/2002 | Kimoto | |
| 2003/0108280 | A1* | 6/2003 | Puzey | H04B 10/508 |
| | | | | 385/24 |
| 2004/0066951 | A1* | 4/2004 | Pelly | G06T 1/005 |
| | | | | 382/100 |
| 2005/0031039 | A1* | 2/2005 | Chou | H04N 19/619 |
| | | | | 375/240.18 |
| 2005/0047343 | A1* | 3/2005 | Sharony | H04L 47/10 |
| | | | | 370/428 |
| 2008/0104648 | A1* | 5/2008 | Chae | H04N 19/107 |
| | | | | 375/E7.176 |
| 2009/0034608 | A1* | 2/2009 | Gisquet | H04N 19/176 |
| | | | | 375/240.01 |
| 2009/0052531 | A1 | 2/2009 | Mulroy et al. | |
| 2009/0138933 | A1* | 5/2009 | Marc | H04N 19/164 |
| | | | | 348/608 |
| 2009/0153668 | A1* | 6/2009 | Kim | H04N 21/654 |
| | | | | 348/180 |
| 2009/0279615 | A1* | 11/2009 | Au | H04N 19/61 |
| | | | | 375/240.27 |
| 2011/0066539 | A1* | 3/2011 | Auerbach | G06Q 40/04 |
| | | | | 705/37 |
| 2014/0219364 | A1* | 8/2014 | Gu | H04N 19/154 |
| | | | | 375/240.26 |
| 2017/0026885 | A1* | 1/2017 | Panigrahi | H04W 76/23 |
| 2018/0332293 | A1 | 11/2018 | Park et al. | |
| 2019/0158704 | A1* | 5/2019 | Sines | G06T 9/00 |
| 2020/0092574 | A1 | 3/2020 | Li et al. | |
| 2021/0028889 | A1* | 1/2021 | Stathakis | H04L 1/189 |

FOREIGN PATENT DOCUMENTS

| | | |
|---|---|---|
| JP | 10-191356 A | 7/1998 |
| JP | 2000-165881 A | 6/2000 |
| JP | 2011-193415 A | 9/2011 |
| WO | 2019/097319 A1 | 5/2019 |
| WO | 2020/194958 A1 | 10/2020 |

OTHER PUBLICATIONS

Bhadra Dhwani R et al: "Packet loss probability in wireless networks: A survey", 2015 International Conference on Communications and Signal Processing (ICCSP), IEEE, Apr. 2, 2015 (Apr. 2, 2015), pp. 1348-1354, XP032807602, DOI: 10.1109/ICCSP.2015.7322729.

Zhongyuan Wang et al: "A hybrid intra refresh and reference selection scheme for mobile video coding", 2017 IEEE International Conference on Multimedia & Expo Workshops (ICMEW), IEEE, Jul. 10, 2017 (Jul. 10, 2017), pp. 357-362, XP033148312, DOI: 10.1109/ICMEW.2017.8026249.

Office Action issued Jun. 29, 2024 in Chinese Patent Application No. 202180013388.7 with English translation thereof.

Yiting Liao, et al., "Routing-aware Multiple Description Coding with Multipath Transport for Video Delivered over Mobile Ad-hoc Networks", Globecom Workshops (GC WKSHPS), 2010 IEEE, IEEE, Piscataway, NJ, USA, Dec. 6, 2010, pp. 939-943,XP031859357,ISBN: 978-1-4244-8863-6.

* cited by examiner

F I G. 2

| FRAME NUMBER | FRAME FORMAT DATA | TRANSMISSION-CONFIRMED FLAG | TRANSMISSION FAILURE PROBABILITY DATA | SCENE CHANGE FLAG | REFERENCE COUNT DATA | INTRA PREDICTION CODE RATE DATA | FRAME SCORE DATA |
|---|---|---|---|---|---|---|---|
| 8 | I | 1 | 0 | 0 | 5 | 100 | 70 |
| 9 | P | 1 | 0 | 0 | 4 | 30 | 50 |
| 10 | P | 1 | 0 | 0 | 3 | 20 | 30 |
| 11 | P | 1 | 0 | 0 | 3 | 70 | 60 |
| 12 | P | 0 | 80 | 0 | 1 | 10 | 40 |
| 13 | P | 0 | 70 | 0 | 2 | 40 | 75 |
| 15 | P | 0 | 20 | 0 | 0 | 50 | 55 |
| 7 | P | 1 | 0 | 0 | 1 | 10 | 10 |
| 6 | I | 1 | 0 | 1 | 8 | 100 | 90 |
| 14 | P | 0 | 30 | 0 | 2 | 50 | 45 |

| FRAME NUMBER | TRANSMISSION SUCCESS/ FAILURE FLAG | PARALLELLY ISSUED TRANSFER NUMBER DATA | EFFECTIVE BANDWIDTH DATA | Ack RESPONSE TIME DATA |
|---|---|---|---|---|
| 1 | 1 | a01 | b01 | c01 |
| 2 | 1 | a02 | b02 | c02 |
| 3 | 0 | a03 | b03 | - |
| 4 | 1 | a04 | b04 | c04 |

FIG.5

| INITIAL VALUE | a1 |
|---|---|
| VALUE OF SCENE CHANGE FLAG=1 | +a2 |
| VALUE OF REFERENCE COUNT DATA IS INCREASED BY 1 | +a3 |
| VALUE OF INTRA PREDICTION CODE RATIO DATA≥THRESHOLD th | +a4 |
| NEW IMAGE DATA IS GENERATED | -a5 |

FIG.6

| SCORE BASED ON DATA SIZE | b1 |
|---|---|
| TRANSMISSION-CONFIRMED FRAME IMAGE IS REFERRED TO | +b2 |
| SCORE BASED ON TRANSMISSION FAILURE PROBABILITY | +b3 | ardize

TRANSMISSION APPARATUS, TRANSMISSION METHOD, AND PROGRAM

TECHNICAL FIELD

The present invention relates to a transmission apparatus, a transmission method, and a program.

BACKGROUND ART

In the cloud gaming service technology, which has attracted attention in recent years, a frame image depicting the situation of play in a video game is generated in a cloud server. Then, image data obtained by encoding the frame image in question is transmitted from the cloud server to a terminal, and the frame image obtained by decoding the image data in question is displayed on the terminal. The series of processing is repeatedly executed, so that a moving image depicting the situation of play in the video game is displayed on the terminal.

Further, there has been known a technology that sets a referent to compress the size of image data generated by encoding an image. For example, image data obtained by encoding a frame image to a P-frame that needs a referent is smaller in size than image data obtained by encoding a frame image to an I-frame that needs no referent.

SUMMARY

Technical Problems

Due to the effect of overload on or unstable connection with a server or a network, a terminal fails to receive image data in some cases, for example, image data does not arrive at the terminal or the terminal receives image data corrupted in whole or in part.

Here, even when successfully receiving image data that needs a referent, the terminal cannot decode the successfully received image data when the terminal has previously failed to receive image data that is the referent of the image data in question, with the result of the transmission of the image data in question by the cloud server being wasted.

However, when image data that needs no referent is always transmitted with no transmitting image data that needs a referent being transmitted to prevent such wasteful image data transmission, image data large in data size is transmitted, with the result of a load being applied on the network.

Note that, this is typically applicable not only to a case where cloud gaming services are provided, but also to a case where a transmission apparatus corresponding to the cloud server described above transmits moving images.

The present invention has been made in view of the actual circumstance described above and has an object to provide a transmission apparatus, a transmission method, and a program that achieve transmission of image data having an appropriate referent with a small network load.

Solution to Problems

In order to solve the problem described above, according to the present invention, there is provided a transmission apparatus including an acquisition unit configured to sequentially acquire frame images drawn in a frame buffer, an encoding processing unit configured to sequentially encode encoding units each corresponding to part or whole of one of the frame images to generate image data, a transmission unit configured to sequentially transmit the image data, a transmission failure probability estimating unit configured to estimate, after the transmission of the image data, a transmission failure probability that is a probability of failure of the transmission of the image data, and a referent determining unit configured to determine, in reference to the transmission failure probability of the image data, one or a plurality of referents that serve as a referent of a given encoding unit from the encoding units related to the image data transmitted, in which the encoding processing unit encodes the given encoding unit by referring to the one or the plurality of referents and thereby generates the image data.

In an aspect of the present invention, the transmission failure probability estimating unit estimates the transmission failure probability in reference to an elapsed time from start of transmission of the image data to a current time.

Further, in an aspect of the present invention, the transmission failure probability estimating unit estimates the transmission failure probability in reference to an effective bandwidth of a communication path for the image data.

Further, in an aspect of the present invention, the transmission failure probability estimating unit estimates the transmission failure probability in reference to the number of pieces of the image data transmitted for which a corresponding acknowledgment has not been received and a predetermined timeout time has not elapsed since the transmission.

Further, in an aspect of the present invention, the transmission apparatus further includes a candidate holding unit configured to hold a plurality of pieces of candidate data corresponding to the encoding units related to the image data transmitted, and the referent determining unit determines the one or the plurality of referents from the encoding units corresponding to the candidate data.

In this aspect, the transmission apparatus may further include a candidate managing unit configured to hold the candidate data in the candidate holding unit, and when the number of the pieces of candidate data held in the candidate holding unit has reached an upper limit, the candidate managing unit may hold new candidate data in the candidate holding unit and may delete one of the pieces of candidate data held in the candidate holding unit from the candidate holding unit.

In addition, the candidate managing unit may delete, from the candidate holding unit, the candidate data determined in reference to a ratio of the number of coding unit blocks subjected to intra prediction coding to the number of coding unit blocks included in one of the encoding units.

Alternatively, the candidate managing unit may delete, from the candidate holding unit, the candidate data determined according to whether or not each of the frame images including the encoding units is an image immediately after a scene change.

Alternatively, the candidate managing unit may delete, from the candidate holding unit, the candidate data determined according to an order in which the encoding units have been encoded.

Alternatively, the candidate managing unit may delete, from the candidate holding unit, the candidate data determined according to an order in which the encoding units have been referred to.

Alternatively, the candidate managing unit may perform control such that a terminal that is a transmission destination of the image data holds the candidate data that is a copy of the candidate data held in the candidate holding unit.

In this aspect, the candidate managing unit may transmit, every time the candidate data held in the candidate holding unit is changed, an update notification indicating the change, to the terminal, and thereby synchronize the candidate data held in the terminal and the candidate data held in the candidate holding unit with each other.

Further, in an aspect of the present invention, the referent determining unit determines the one or the plurality of referents according to the degree of smallness of a data size of the image data generated by referring to one of the encoding units related to the image data transmitted and encoding the given encoding unit is.

Further, according to the present invention, there is provided a transmission method including an acquisition step of sequentially acquiring frame images drawn in a frame buffer, an encoding processing step of sequentially encoding encoding units each corresponding to part or whole of one of the frame images to generate image data, a transmission step of sequentially transmitting the image data, a transmission failure probability estimating step of estimating, after the transmission of the image data, a transmission failure probability that is a probability of failure of the transmission of the image data, and a referent determining step of determining, in reference to the transmission failure probability of the image data, one or a plurality of referents that serve as a referent of a given encoding unit from the encoding units related to the image data transmitted, in which, in the encoding processing step, the given encoding unit is encoded by referring to the one or the plurality of referents, and the image data is thereby generated.

Further, according to the present invention, there is provided a program for causing a computer to execute an acquisition procedure of sequentially acquiring frame images drawn in a frame buffer, an encoding processing procedure of sequentially encoding encoding units each corresponding to part or whole of one of the frame images to generate image data, a transmission procedure of sequentially transmitting the image data, a transmission failure probability estimating procedure of estimating, after the transmission of the image data, a transmission failure probability that is a probability of failure of 9 the transmission of the image data, and a referent determining procedure of determining, in reference to the transmission failure probability of the image data, one or a plurality of referents that serve as a referent of a given encoding unit from the encoding units related to the image data transmitted, in which, in the encoding processing procedure, the given encoding unit is encoded by referring to the one or the plurality of referents, and the image data is thereby generated.

BRIEF DESCRIPTION OF DRAWINGS

FIG. 2 is a diagram illustrating exemplary candidate management data.

FIG. 5 is a diagram illustrating an exemplary deciding rule for a value of frame score data.

FIG. 6 is a diagram illustrating an exemplary deciding rule for a value of case score data.

DESCRIPTION OF EMBODIMENT

Figure 1:
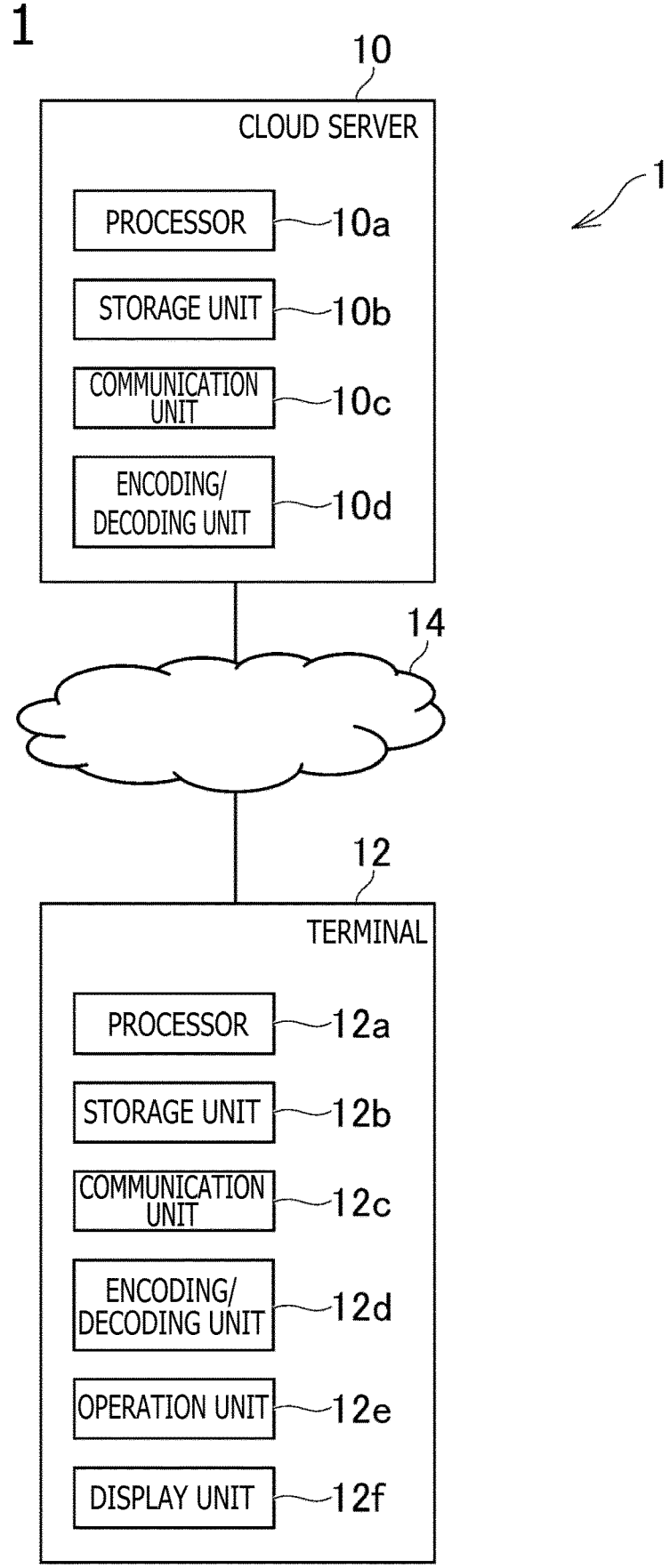
FIG. 1 is a diagram illustrating an exemplary overall configuration of a cloud gaming system according to an embodiment of the present invention.

FIG. 1 is a diagram illustrating an exemplary overall configuration of a cloud gaming system 1 according to an embodiment of the present invention. As illustrated in FIG. 1, the cloud gaming system 1 according to the present embodiment includes a cloud server 10 and a terminal 12 each of which mainly includes a computer. The cloud server 10 and the terminal 12 are connected to a computer network 14 such as the Internet, so that the cloud server 10 and the terminal 12 can communicate with each other.

The cloud server 10 according to the present embodiment is, for example, a server computer configured to execute a video game program based on a cloud gaming service. The cloud server 10 delivers a moving image depicting the situation of play in the video game in question to the terminal 12 used by a user playing the video game in question.

As illustrated in FIG. 1, the cloud server 10 includes, for example, a processor 10a, a storage unit 10b, a communication unit 10c, and an encoding/decoding unit 10d.

The processor 10a is, for example, a program control device such as a central processing unit (CPU) and executes various types of information processing in accordance with programs stored in the storage unit 10b. The processor 10a according to the present embodiment also includes a graphics processing unit (GPU) configured to draw images in a frame buffer according to graphic commands or data supplied from the CPU in question.

The storage unit 10b is, for example, a storage element such as a read only memory (ROM) or a random access memory (RAM) or a solid-state drive (SSD). The storage unit 10b stores, for example, the programs that are executed by the processor 10a. Further, the storage unit 10b according to the present embodiment has the frame buffer area in which the GPU included in the processor 10a draws images.

The communication unit 10c is, for example, a communication interface for transmitting/receiving data to/from computers such as the terminal 12 via the computer network 14.

The encoding/decoding unit 10d includes, for example, an encoder and a decoder. The encoder in question encodes an input image to generate image data indicating the image in question. Further, the decoder in question decodes input image data to output an image indicated by the image data in question.

The terminal 12 according to the present embodiment is, for example, a computer used by the user who uses the cloud gaming service, such as a video game console, a personal computer, a tablet device, or a smartphone.

As illustrated in FIG. 1, the terminal 12 includes, for example, a processor 12a, a storage unit 12b, a communication unit 12c, an encoding/decoding unit 12d, an operation unit 12e, and a display unit 12f.

The processor 12a is, for example, a program control device such as a CPU and executes various types of information processing in accordance with programs stored in the storage unit 12b. The processor 12a according to the present embodiment also includes a GPU configured to draw images in a frame buffer according to graphic commands or data supplied from the CPU in question.

The storage unit 12b is, for example, a storage element such as a ROM or a RAM or an SSD. The storage unit 12b stores, for example, the programs that are executed by the processor 12a. Further, the storage unit 12b according to the present embodiment has the frame buffer area in which the GPU included in the processor 12a draws images.

The communication unit 12c is, for example, a communication interface for transmitting/receiving data to/from computers such as the cloud server 10 via the computer network 14.

The encoding/decoding unit 12d includes, for example, an encoder and a decoder. The encoder in question encodes an input image to generate image data indicating the image in question. Further, the decoder in question decodes input image data to output an image indicated by the image data in question.

The operation unit 12e is, for example, an operation member for performing input operation on the processor 12a.

The display unit 12f is, for example, a display device such as a liquid crystal display or an organic electroluminescence (EL) display.

Note that, the terminal 12 is not necessarily required to include the GPU and the frame buffer.

When video game-related operation is performed on the terminal 12 according to the present embodiment through the operation unit 12e, an operation signal indicating the operation in question is transmitted from the terminal 12 to the cloud server 10. Then, video game processing based on the operation signal in question is executed in the cloud server 10. Then, a play image that is a frame image depicting the situation of play in the video game in question affected by the operation signal is generated, and the play image in question is drawn in the frame buffer of the cloud server 10. In the present embodiment, video game processing and play image generation are repeatedly executed.

Next, the cloud server 10 sequentially acquires the play images drawn in the frame buffer and generates image data depicting the play images in question. Then, the cloud server 10 transmits the generated image data to the terminal 12. Following this, the terminal 12 controls the display unit 12f to display the play images generated by decoding of the image data received from the cloud server 10. In this way, the series of play images is displayed on the display unit 12f in the present embodiment.

In the present embodiment, for example, the cloud server 10 transmits, to the terminal 12, image data that needs no referent such as I-frames or image data that needs a referent such as P-frames. Note that, here, image data related to a referent may be an I-frame or a P-frame.

Further, in the present embodiment, up to a predetermined number of (for example, 10) frame images or image data generated in reference to the frame images in question is held in the memory of the cloud server 10 as candidate data.

FIG. 2 is a diagram illustrating exemplary candidate management data for managing candidate data. As illustrated in FIG. 2, the candidate management data includes, for example, a frame number, frame format data, a transmission-confirmed flag, transmission failure probability data, a scene change flag, reference count data, intra prediction coding ratio data, and frame score data.

The candidate management data is data associated with candidate data, and as the frame number included in the candidate management data, the frame number of a frame image corresponding to the candidate data in question is set.

The frame format data included in the candidate management data illustrated in FIG. 2 is data indicating the frame format of image data generated in reference to the frame image in question. For example, a value I is set when the image data in question is an I-frame, and a value P is set when the image data in question is a P-frame.

The transmission-confirmed flag included in the candidate management data illustrated in FIG. 2 is a flag indicating whether the transmission of the image data generated in reference to the frame image in question has succeeded or not (or failed).

In the present embodiment, when successfully receiving image data, the terminal 12 transmits, to the cloud server 10, an acknowledgment (Ack) indicating the success of the reception of the image data. The acknowledgment in question is associated with the frame number, for example. The value of the transmission-confirmed flag is initially 0. Further, when the cloud server 10 receives the acknowledgment, the value of the candidate management data including the frame number associated with the acknowledgment in question is changed to 1.

The transmission failure probability data included in the candidate management data illustrated in FIG. 2 is data indicating the probability of failure of the transmission of the image data generated in reference to the frame image in question (hereinafter referred to as the "transmission failure probability").

In the present embodiment, for example, the form of a function for estimating a transmission failure probability that is a function of three variables having parameters including the number of response-waiting transactions (hereinafter referred to as the "parallelly issued transfer number"), the effective bandwidth of a communication path for image data, and an elapsed time from the start of transmission of image data to a current time is determined. Here, a parallelly issued transfer number corresponds, for example, to the number of pieces of image data for which the corresponding acknowledgments have not been received and a predetermined timeout time has not elapsed since the transmission.

Figures 3, 4:
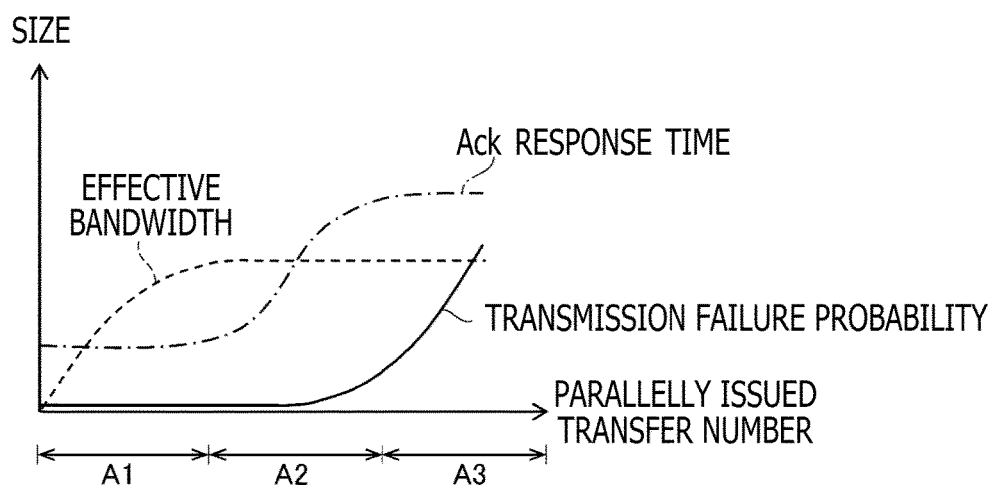
FIG. 3 is a diagram illustrating exemplary statistical data.
FIG. 4 is an explanatory diagram schematically illustrating an exemplary general relation between a transmission failure probability, a parallelly issued transfer number, an effective bandwidth, and an Ack response time.

FIG. 3 is a diagram illustrating exemplary statistical data that is used for determining the form of a function described above. As illustrated in FIG. 3, the statistical data includes, for example, a frame number, a transmission success/failure flag, parallelly issued transfer number data, effective bandwidth data, and Ack response time data.

In the present embodiment, for example, when the cloud server 10 receives an acknowledgment, statistical data including a frame number associated with the acknowledgment in question is newly registered. As the value of the transmission success/failure flag of the statistical data in question, 1 is set, for example.

Further, in the present embodiment, when the predetermined timeout time has elapsed since the start of transmission of image data, statistical data including the frame number of the image data in question is newly registered. As the value of the transmission success/failure flag of the statistical data in question, 0 is set, for example.

In the present embodiment, a parallelly issued transfer number and an effective bandwidth are constantly monitored. Further, the parallelly issued transfer number value and effective bandwidth value at the time of register of statistical data are set to the parallelly issued transfer number value and effective bandwidth value included in the statistical data in question.

Further, in the present embodiment, the timing of the start of transmission of image data is recorded. Further, when the cloud server 10 receives an acknowledgment, the value of Ack response time data indicating a time from the start of transmission of image data corresponding to the acknowledgment in question to the reception of the acknowledgment in question (hereinafter referred to as the "Ack response time") is set to the value of the Ack response time data included in statistical data corresponding to the image data in question. Note that, for statistical data having a transmission success/failure flag with a value of 0, the value of the Ack response time data may not be set. Further, for example, for statistical data having a transmission success/failure flag with a value of 0, dummy Ack response time data that has the maximum Ack response time value or the value of a predetermined multiple of the maximum Ack response time value may be set.

Further, in the present embodiment, in reference to statistical data exemplified in FIG. 3, a predetermined rule is applied to determine the form of a function for estimating a transmission failure probability. Here, for example, a statistical method such as multiple logistic regression may be used. In this way, in the present embodiment, the form of a function is determined in reference to the profiling result of statistical data.

Note that, with regard to image data for which a transmission failure probability is to be estimated, the Ack response time itself cannot be measured since the acknowledgment has not been received yet. Hence, in the present embodiment, although an elapsed time from the start of transmission of image data to a current time is not the same as an Ack response time, as the transmission failure probability of image data based on an Ack response time, a transmission failure probability based on an elapsed time from the start of transmission of the image data to a current time is indirectly estimated by referring to the statistics of the Ack response time. In this regard, an Ack response time cannot be treated in the same manner as that for a parallelly issued transfer number and an effective bandwidth.

In light of the above points, in the present embodiment, a correspondence between an elapsed time from the start of transmission of image data to a current time and a transmission failure probability may be determined in reference to the statistics of Ack response time data. For example, the form of a function corresponding to a representative value such as the average or maximum value or a value in a predetermined top percentage (for example, 10%) of Ack response time data may be determined. For example, the form of a function in which, when a value indicating an elapsed time from the start of transmission of image data to a current time exceeds the representative value in question, the transmission failure probability exponentially and sharply increases may be determined.

FIG. 4 is an explanatory diagram schematically illustrating an exemplary general relation between a transmission failure probability, a parallelly issued transfer number, an effective bandwidth, and an Ack response time.

In FIG. 4, the transmission failure probability is indicated by the solid line, the effective bandwidth is indicated by the dashed line, and the Ack response time is indicated by the long dashed short dashed line.

It is assumed that the cause of image data transmission failure is the congestion of a communication path for image data that causes image data discarding in the middle of the communication path in question. In this case, in the congestion state, the amount of image data exceeding the processing capability of communication equipment such as a switch or a router on the communication path is input to the communication equipment, resulting in the overflow of the buffer of the communication equipment. Then, the excess image data is discarded.

As illustrated in FIG. 4, as the parallelly issued transfer number increases, the effective bandwidth of the communication path reaches its limit. Further, as the parallelly issued transfer number further increases, the length of time that image data stays in the buffer of the communication equipment such as a switch or a router increases (that is, queuing time increases), with the result that the Ack response time increases.

In a range A1 illustrated in FIG. 4 in which the effective bandwidth of the communication path does not reach its limit, the queue in the buffer of the communication equipment such as a switch or a router is 0. Next, in a range A2 illustrated in FIG. 4, the effective bandwidth stops at the limit, and the Ack response time increases.

Then, as the parallelly issued transfer number further increases, the buffer overflows, resulting in image data discarding. In a range A3 illustrated in FIG. 4, the Ack response time reaches its limit, and the transmission failure probability sharply increases.

Since the relation described above typically holds, it can be said that it is appropriate to use, in combination, a parallelly issued transfer number, an effective bandwidth, and a time elapsed from the start of transmission of image data that corresponds to an Ack response time as the parameters of a function for estimating a transfer failure probability.

Note that, in FIG. 4, it seems that a transmission failure probability can be estimated only in reference to a parallelly issued transfer number. In practice, however, the relation illustrated in FIG. 4 does not always hold since programmable buffer threshold/priority-based overtake control, input/output arbitration control using random numbers, or the like is performed in the buffer flow control of the communication equipment such as a switch or a router.

Further, in the present embodiment, a transmission failure probability value estimated in reference to a function determined as described above is set as the value of the transmission failure probability data included in candidate management data. For example, a transmission failure probability calculated by substituting a current parallelly issued transfer number value, a current effective bandwidth value, and a value indicating a time elapsed from the start of transmission of image data for the parameters of the function in question is set to the value of the transmission failure probability data included in candidate management data corresponding to the image data in question. Note that, for candidate management data having a transmission-confirmed flag with a value of 1, 0 may be set as the value of the transmission failure probability data.

Further, in the present embodiment, every time new statistical data is registered, the form of a function for estimating a transfer failure probability is determined, so that the form of the function in question is sequentially updated.

Further, in response to the update of the form of a function, the value of the transmission failure probability data included in candidate management data is updated in reference to the updated function in question.

Note that, the form of a function for estimating a transfer failure probability and the determination method therefor are not particularly limited to any kind. For example, the form of a function for estimating a transmission failure probability that is a function of two variables having parameters including a current effective bandwidth value/the maximum effective bandwidth value and an elapsed time from the start of transmission of image data to a current time/the maximum Ack response time value may be determined.

Further, in estimating a transmission failure probability, instead of the current value of a parallelly issued transfer number described above, a parallelly issued transfer number at the time of the start of transmission of image data may be used. Further, instead of the current value of an effective bandwidth described above, an effective bandwidth at the time of the start of transmission of image data may be used.

The scene change flag included in the candidate management data illustrated in FIG. 2 is a flag indicating whether or not the frame image in question is an image immediately after a scene change. For example, a value of 1 is set in a case where the frame image in question is an image immediately after a scene change, and a value of 0 is otherwise set.

Here, for example, while the user is playing the video game, a frame image associated with scene change data based on whether or not there is a scene change from the immediately prior frame may be generated. For example, a frame image may be associated with scene change data with a value of 1 when having a scene change from the immediately prior frame and may otherwise be associated with scene change data with a value of 0. Then, a scene change flag value based on the scene change data value may be set.

A frame image associated with scene change data is generated by a drawing program such as the video game program included in the cloud server 10, for example. Note that, a frame image associated with scene change data may be generated by a game engine.

Further, according to the result of a comparison between a frame image and the frame image of a frame immediately prior to the frame image in question, whether or not there is a scene change from the immediately prior frame may be determined. Then, a scene change flag value based on the result of the determination in question may be set.

For example, it may be determined that there is a scene change from the immediately prior frame in a case where a value indicating the amount of scene change is larger than a predetermined value, and it may otherwise be determined that there is no scene change from the immediately prior frame.

Here, as a value indicating the amount of scene change, for example, an index value indicating the degree of difference or similarity between the immediately prior frame image and the frame image in question may be used. For example, it may be determined that there is no scene change in a case where Peak Signal to Noise Ratio (PSNR) or Structural Similarity (SSIM) is smaller than a predetermined value, and it may otherwise be determined that there is a scene change. Alternatively, as the amount of scene change, a Motion Estimation (ME) change amount may be used. For example, it may be determined that there is a scene change in a case where the value of a ME change amount is larger than a predetermined value, and it may otherwise be determined that there is no scene change. Alternatively, as a value indicating the amount of scene change, a value indicating the degree of audio discontinuity between a timing at which the immediately prior frame image is displayed and a timing at which the frame image of the frame in question is displayed may be used. For example, it may be determined that there is a scene change in a case where the value in question is larger than a predetermined value, and it may otherwise be determined that there is no scene change.

Further, whether or not there is a scene change from the immediately prior frame may be determined in reference to the change amount of a score value that is derived in reference to a predetermined rule and that indicates the content of a frame image. For example, whether or not there is a scene change may be determined in reference to the change amount of a score value calculated from whether or not a scene change timing has come or information regarding, for example, the type of image texture represented in a frame, the distribution of feature points, depth information, the amount of objects, the usage of mipmap textures used for three dimensional (3D) graphics per level, level of detail (LOD), the usage of tessellation per level, the amount of characters and symbols, or the type of represented scene. Here, for example, a score value indicating the priority of spatial and temporal details may be calculated.

The reference count data included in the candidate management data illustrated in FIG. 2 is data indicating the number of times of being used as the referent of other image data. In the present embodiment, for example, every time a frame image is referred to, the value of the reference count data included in candidate management data corresponding to the frame image in question is increased by 1.

The intra prediction coding data included in the candidate management data illustrated in FIG. 2 is data indicating the ratio of the number of coding unit blocks subjected to intra prediction coding to the number of coding unit blocks included in the frame image in question (hereinafter referred to as the "intra prediction coding ratio"). In the example of FIG. 2, intra prediction coding ratios are expressed in percentage. For example, in a case where all coding unit blocks included in a frame image have been subjected to intra prediction coding, an intra prediction coding data value of 100 is set.

The frame score data included in the candidate management data illustrated in FIG. 2 is data indicating the score of the frame image in question. In the present embodiment, for example, candidate data to be deleted from the memory is determined in reference to the value of frame score data.

In the present embodiment, for example, the value of frame score data is determined in reference to the value of a scene change flag, the value of reference count data, and the value of intra prediction coding ratio data.

FIG. 5 is a diagram illustrating an exemplary deciding rule for the value of frame score data.

For example, as the value of the frame score data of candidate management data corresponding to new candidate data, an initial value a1, which is a predetermined value, may first be set.

Then, in a case where the value of the scene change flag of the candidate management data in question is 1, a predetermined value a2 may be added to the frame score data.

Further, for the candidate management data in question, a predetermined value a3 may be added to the frame score data every time the value of the reference count data is increased by 1.

Further, a predetermined value a4 may be added to the frame score data in a case where the value of the intra prediction coding ratio data of the candidate management data in question is equal to or larger than a predetermined threshold th.

Further, for the existing candidate management data, the frame score data may be decreased by a predetermined value a5 every time image data is generated in reference to a new frame image.

Then, in the present embodiment, when the number of pieces of candidate data held in the memory has reached an upper limit and candidate data corresponding to new image data is to be held, candidate data corresponding to candidate management data having the smallest frame score data value is deleted from the memory. Further, the candidate management data in question is also deleted. In this way, the candidate data held in the memory is sequentially updated. Here, in a case where there are a plurality of pieces of candidate management data having the smallest frame score data value, candidate data corresponding to candidate management data corresponding to a frame image most recently referred to (Least Recently Used: LRU) may be preferentially kept in the memory. In this way, candidate data to be deleted from the memory may be determined according to the order in which corresponding frame images have been referred to.

Further, in the present embodiment, when a frame image immediately after a scene change is generated, candidate data corresponding to the frame images of frames prior to the frame image in question are deleted from the memory. Further, candidate management data corresponding to the candidate data in question is also deleted.

Note that, in a case where a frame image immediately after a scene change is generated and the intra prediction coding ratio of the frame image in question is larger than a value set in advance, candidate data corresponding to the frame images of frames prior to the frame image in question may be deleted from the memory. Also in this case, candidate management data corresponding to the candidate data in question is deleted.

In the present embodiment, the pieces of candidate data held in the memories of the cloud server 10 and the terminal 12 are synchronized with each other. For example, every time the candidate data held in the memory of the cloud server 10 is changed, an update notification indicating the change in question is transmitted to the terminal 12 and the terminal 12 changes the candidate data held in the memory of the terminal 12 (the copy of the candidate data held in the memory of the cloud server 10) to match the candidate data with the candidate data held in the cloud server 10.

Then, in the present embodiment, from frame images corresponding to candidate data, the referent of a frame image to be newly encoded is determined.

FIG. 6 is a diagram illustrating an exemplary deciding rule for the value of case score data that is used for referent determination.

First, for each coding unit block (for example, macroblock) included in a frame image to be newly encoded, a predetermined number of frame images corresponding to candidate data are identified in an order starting from a frame image which achieves smallest data size by reference and encoding. At this time, to reduce the amount of calculation and processing time, some frame images corresponding to candidate data may be selected by referring to the motion vector of a coding unit block. Then, a predetermined number of frame images may be identified from the selected frame images.

Then, in the present embodiment, the data size of image data generated by encoding a new frame image under the same quantization parameter (QP) conditions is calculated for each of the following cases, for example: (1) a case in which no other frame image is referred to, (2) a case in which a single frame image is referred to, and (3) a case in which a plurality of frame images are referred to. In the case (2), for each frame image identified for any coding unit block as described above, a data size in a case where the frame image in question is referred to is calculated. In a case where the number of frame images identified for any coding unit block as described above is n, a data size in each of n cases is calculated. In the case (3), a data size in a case where each coding unit block refers to frame images identified as described above is calculated. For example, in a case where the number of coding unit blocks is m and two frame images are identified for each coding unit block, a data size is calculated for each of two to the power of m cases.

Then, for each case described above, a value b1 obtained by normalization based on the data size calculated for the case in question is first determined as the value of the case score of the case in question. Here, as the value b1, a larger value may be set for a case in which a smaller data size is calculated.

Then, a predetermined value b2 is added to the value of the case score of a case in which a frame image corresponding to candidate management data having a transmission-confirmed flag with a value of 1 is referred to. The value b2 is desirably a sufficiently large value.

Then, for each case, a value b3 based on the value of the transmission failure probability data of candidate management data corresponding to the frame image referred to in the case in question is added to the value of the case score. Here, the value b3 is smaller than the value b2. Note that, the value b3 may also be added to the value of the case score of candidate management data having a transmission-confirmed flag with a value of 0.

For example, for a case where a frame image corresponding to candidate management data having a transmission failure probability data value smaller than a predetermined value is referred to, the predetermined value b3 may be added to the value of the case score. Further, for example, the value b3 that decreases as the transmission failure probability data value increases may be added to the value of a case score. Further, for example, for a case where a plurality of frame images are referred to, the value b3 may be determined in reference to the representative value (for example, average value) of the values of transmission failure probability data corresponding to the plurality of frame images.

Then, in the present embodiment, for example, in reference to the case score determined for each case as described above, a case corresponding to the encoding scheme of a new frame image is determined. For example, a case having the highest case score is determined as a case corresponding to the encoding scheme of a new frame image.

Then, the new frame image is encoded by the encoding scheme corresponding to the determined case, and new image data is generated.

Here, in a case where the case (1) described above is determined, no frame image is used as a referent and new image data that needs no referent (for example, I-frame) is generated in reference to the new frame image.

In a case where the case (2) is determined, the new frame image is encoded by referring to a single frame image referred to in the case in question, and new image data is thereby generated.

In a case where the case (3) is determined, the new frame image is encoded for each of a plurality of coding unit blocks by referring to frame images referred to in the case in question, and new image data is thereby generated.

As described above, in the present embodiment, when image data that needs a referent is generated, a new frame image is encoded by referring to a frame image corresponding to candidate data determined in reference to a transmission failure probability, and new image data is thereby generated. Specifically, for example, a new frame image is encoded by referring to a frame image corresponding to candidate data having a transmission failure probability of 0 or a relatively smaller transmission failure probability than other candidate data, and new image data is thereby generated.

Figure 7:
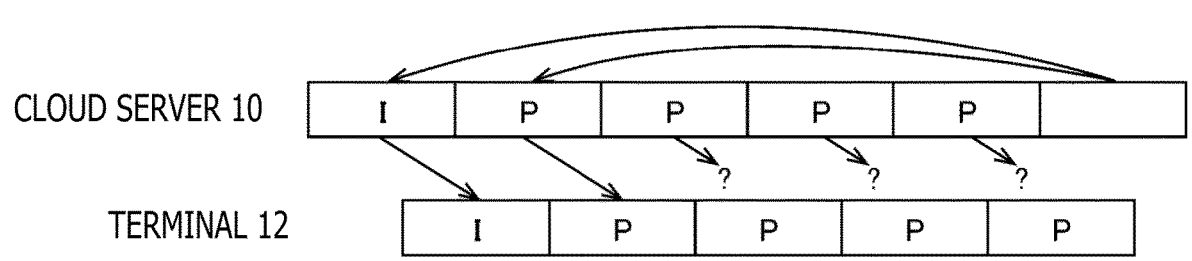
FIG. 7 is an explanatory diagram illustrating an example of how to determine a referent in the present embodiment.

For example, a case where six pieces of image data are successively generated as illustrated in FIG. 7 and whether or not the third P-frame from the left and the following P-frames have been successfully transmitted is unknown is assumed. Note that, in FIG. 7, I-frames are expressed as I and P-frames are expressed as P. In this case, the rightmost frame image is typically encoded by referring to the immediately prior P-frame. In the present embodiment, however, the rightmost frame image is encoded by referring to the leftmost I-frame or second P-frame from the left that is confirmed as having been successfully transmitted. The rightmost frame image is encoded by referring to the leftmost I-frame and the second P-frame from the left in some cases. Alternatively, the rightmost frame image is encoded to an I-frame that refers to no frame image in some cases.

Due to the effect of overload on or unstable connection with the cloud server 10 or the computer network 14, the terminal 12 fails to receive image data in some cases, for example, image data does not arrive at the terminal 12 or the terminal 12 receives image data corrupted in whole or in part.

Here, even when successfully receiving image data that needs a referent, the terminal 12 cannot decode the successfully received image data when having failed to receive image data that is the referent of the image data in question, with the result of the transmission of the image data in question by the cloud server 10 being wasted.

However, when image data that needs no referent is always transmitted with image data that needs a referent not being transmitted to prevent such wasteful image data transmission, image data large in data size is transmitted, with the result of a load being applied on the computer network 14.

In the present embodiment, as described above, a new frame image is encoded by referring to a frame image corresponding to image data having a low transmission failure probability, new image data is thereby generated, and the new image data in question is transmitted. Hence, according to the present embodiment, image data having an appropriate referent can be transmitted with a small network load.

Although the units of encoding, candidate data, referents, and the like are a frame image in the above description, the units of encoding, candidate data, referents, and the like may be a slice obtained by dividing a frame image.

Note that, in a case where a transmission failure occurs in units of coding unit blocks in the decoding processing of image data in the terminal 12 and the decoded image is thus corrupted in part, the image in question is restored with the use of the technology described in International Application No. PCT/JP2019/050907, for example.

Further, in the present embodiment, even in a case where a connectionless protocol such as user datagram protocol (UDP) is used for moving image transmission, handshaking necessary for transmission failure probability estimation is performed.

Now, functions that are implemented in the cloud gaming system 1 according to the present embodiment and processing that is executed in the cloud server 10 are further described.

Figure 8A:
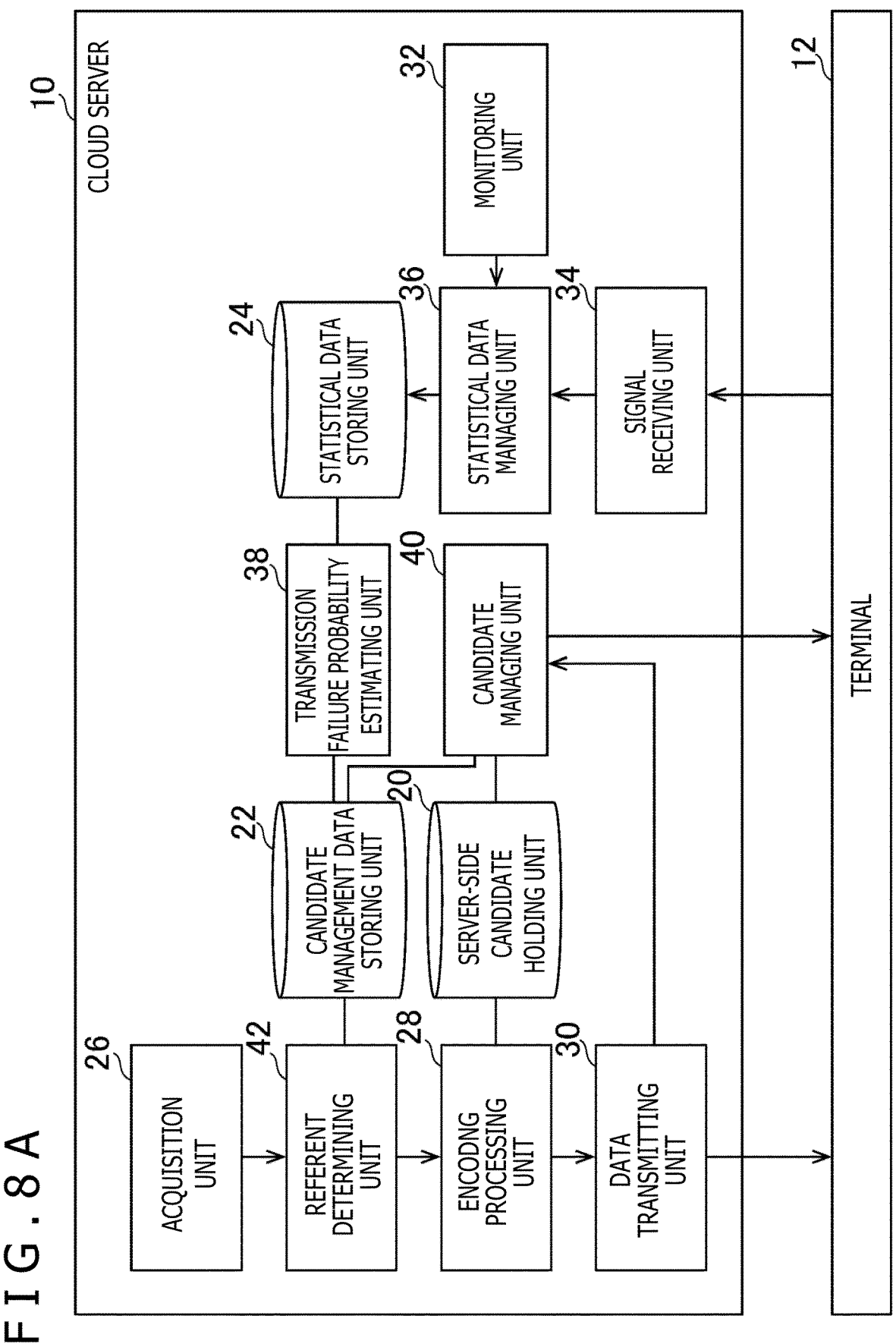
FIG. 8A is a functional block diagram illustrating exemplary functions that are implemented in a cloud server according to the embodiment of the present invention.
Figure 8B:
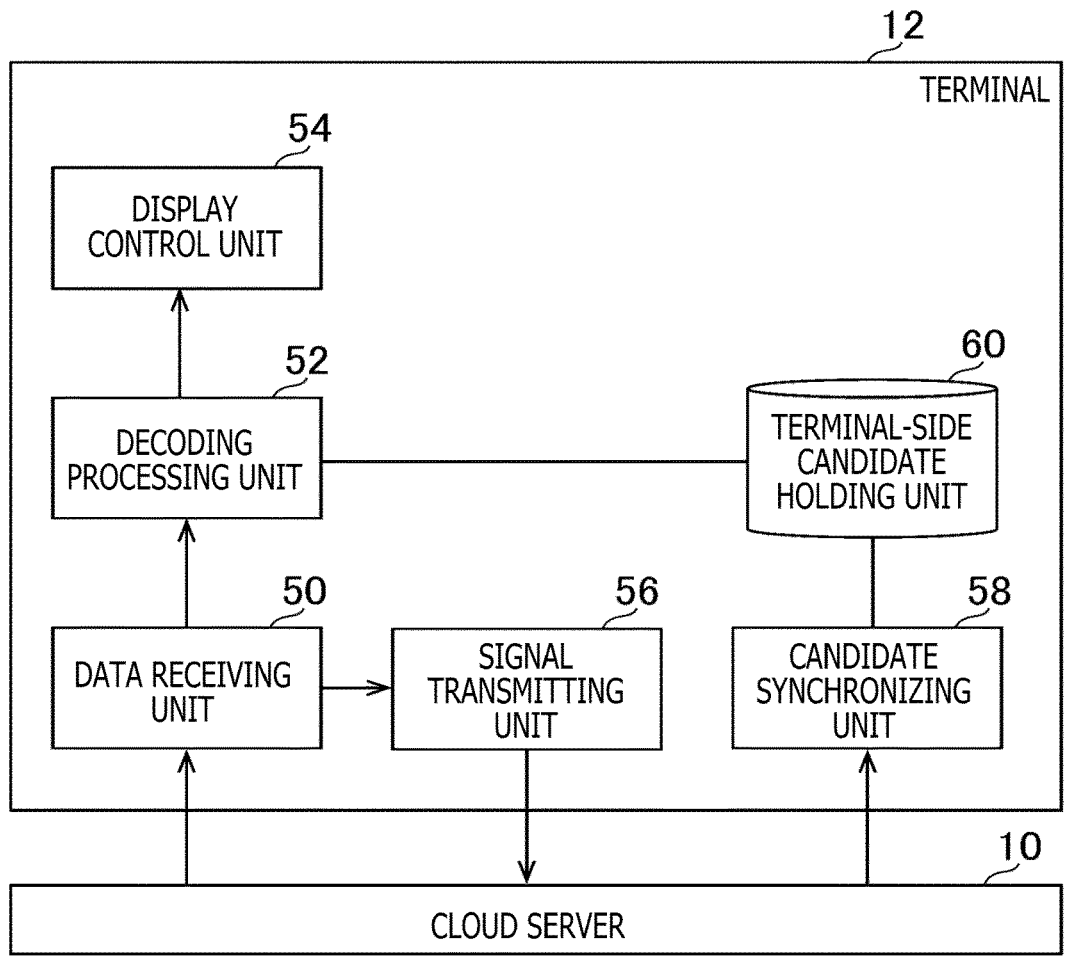
FIG. 8B is a functional block diagram illustrating exemplary functions that are implemented in a terminal according to the embodiment of the present invention.

FIG. 8A and FIG. 8B are functional block diagrams illustrating exemplary functions that are implemented in the cloud gaming system 1 according to the present embodiment. Note that, in the cloud gaming system 1 according to the present embodiment, all the functions illustrated in FIG. 8A and FIG. 8B are not required to be implemented and functions other than the functions illustrated in FIG. 8A and FIG. 8B (for example, a function of execution of video game processing based on operation signals or the like or play image generation) may be implemented.

As illustrated in FIG. 8A, the cloud server 10 according to the present embodiment functionally includes, for example, a server-side candidate holding unit 20, a candidate management data storing unit 22, a statistical data storing unit 24, an acquisition unit 26, an encoding processing unit 28, a data transmitting unit 30, a monitoring unit 32, a signal receiving unit 34, a statistical data managing unit 36, a transmission failure probability estimating unit 38, a candidate managing unit 40, and a referent determining unit 42.

The server-side candidate holding unit 20, the candidate management data storing unit 22, and the statistical data storing unit 24 are implemented by the storage unit 10b as their main parts. The acquisition unit 26 and the encoding processing unit 28 are implemented by the encoding/decoding unit 10d as their main parts. The data transmitting unit 30 and the signal receiving unit 34 are implemented by the communication unit 10c as their main parts. The monitoring unit 32, the statistical data managing unit 36, the transmission failure probability estimating unit 38, and the referent determining unit 42 are implemented by the processor 10a as their main parts. The candidate managing unit 40 is implemented by the processor 10a and the communication unit 10c as its main parts.

Further, the functions described above are implemented by the processor 10a executing a program that is installed on the cloud server 10, which is a computer, and that includes instructions corresponding to the functions described above. The program is supplied to the cloud server 10 through a computer readable information storage medium such as an optical disc, a magnetic disk, a magnetic tape, a magneto-optical disk, or a flash memory or via the Internet, for example.

Further, as illustrated in FIG. 8B, the terminal 12 according to the present embodiment functionally includes, for example, a data receiving unit 50, a decoding processing unit 52, a display control unit 54, a signal transmitting unit 56, a candidate synchronizing unit 58, and a terminal-side candidate holding unit 60.

The data receiving unit 50 and the signal transmitting unit 56 are implemented by the communication unit 12c as their main parts. The decoding processing unit 52 is implemented by the encoding/decoding unit 12d as its main part. The display control unit 54 is implemented by the processor 12a and the display unit 12f as its main parts. The candidate synchronizing unit 58 is implemented by the processor 12a and the communication unit 12c as its main parts. The terminal-side candidate holding unit 60 is implemented by the storage unit 12b as its main part.

Further, the functions described above are implemented by the processor 12a executing a program that is installed on the terminal 12, which is a computer, and that includes instructions corresponding to the functions described above. The program is supplied to the terminal 12 through a computer readable information storage medium such as an optical disc, a magnetic disk, a magnetic tape, a magneto-optical disk, or a flash memory or via the Internet, for example.

The server-side candidate holding unit 20 of the present embodiment holds a plurality of pieces of candidate data corresponding to an encoding unit related to transmitted image data, for example.

The candidate management data storing unit 22 of the present embodiment stores candidate management data associated with corresponding candidate data as exemplified in FIG. 2, for example.

The statistical data storing unit 24 of the present embodiment stores statistical data exemplified in FIG. 3, for example.

The acquisition unit 26 of the present embodiment sequentially acquires frame images (play images in the example described above) drawn in the frame buffer, for example.

The encoding processing unit 28 of the present embodiment sequentially encodes encoding units each corresponding to part or whole of a frame image acquired by the acquisition unit 26 and generates image data, for example. Here, an encoding unit is a frame image in the example described above. In this case, candidate data as described above is the frame image in question or image data generated in reference to the frame image in question. Further, as described above, an encoding unit may be a slice obtained by dividing a frame image. In this case, candidate data as described above may be the slice in question or image data generated in reference to the slice in question.

The data transmitting unit 30 of the present embodiment sequentially transmits image data generated by the encoding processing unit 28 to the terminal 12, for example.

The monitoring unit 32 of the present embodiment monitors the effective bandwidth of the communication path for image data and a parallelly issued transfer number, for example. Here, a parallelly issued transfer number corresponds, for example, to the number of pieces of image data for which the corresponding acknowledgments have not been received and the predetermined timeout time has not elapsed since the transmission, as described above.

The signal receiving unit 34 of the present embodiment receives, from the terminal 12, a signal such as an acknowledgment (Ack) indicating the success of the reception of image data, for example.

The statistical data managing unit 36 of the present embodiment generates new statistical data upon reception of an acknowledgment or elapse of the predetermined timeout time from the start of transmission of image data and stores the generated statistical data in the statistical data storing unit 24, for example. As described above, statistical data having a transmission success/failure flag with a value of 1 is generated in a case where an acknowledgment has been received. Further, statistical data having a transmission success/failure flag with a value of 0 is generated in a case where the predetermined timeout time has elapsed from the start of transmission of image data.

Further, the value of parallelly issued transfer number data and the value of effective bandwidth data are set according to the result of monitoring by the monitoring unit 32. For example, those values may be set according to the result of monitoring at the time of generation of statistical data or the result of monitoring at the time of transmission of image data.

Further, for statistical data having a transmission success/failure flag with a value of 1, the value of the Ack response time data is set as described above. For statistical data having a transmission success/failure flag with a value of 0, a dummy Ack response time data value may be set or no Ack response time data value may be set as described above.

The transmission failure probability estimating unit 38 of the present embodiment estimates, after the transmission of image data, a transmission failure probability that is the probability of failure of the transmission of the image data in question, for example. Here, the transmission failure probability estimating unit 38 may estimate a transmission failure probability in reference to an elapsed time from the start of transmission of image data to a current time. Further, the transmission failure probability estimating unit 38 may estimate a transmission failure probability in reference to the effective bandwidth of the communication path for image data. Further, the transmission failure probability estimating unit 38 may estimate a transmission failure probability in reference to the number of pieces of transmitted image data for which the corresponding acknowledgments have not been received and the predetermined timeout time has not elapsed since the transmission (parallelly issued transfer number described above).

For example, as described above, the transmission failure probability estimating unit 38 may update the form of a function for estimating a transmission failure probability upon storage of new statistical data in the statistical data storing unit 24. Then, the transmission failure probability estimating unit 38 may estimate the transmission failure probability of image data in reference to the updated function, a current parallelly issued transfer number value, a current effective bandwidth value, and an elapsed time from the start of transmission of the image data in question to a current time.

Here, the transmission failure probability estimating unit 38 may estimate, for each of the plurality of pieces of candidate management data stored in the candidate management data storing unit 22, the transmission failure probability of image data corresponding to the candidate management data in question. Further, instead of a current parallelly issued transfer number value, a parallelly issued transfer number at the time of the start of transmission of image data may be used. Further, instead of a current effective bandwidth value, an effective bandwidth at the time of the start of transmission of image data may be used.

Then, the transmission failure probability estimating unit 38 may update, for each of the plurality of pieces of candidate management data stored in the candidate management data storing unit 22, the value of the transmission failure probability data included in the candidate management data in question to a value indicating a transmission failure probability estimated in this way.

Note that, the transmission failure probability estimating unit 38 may set 0 to the value of the transmission failure probability data of candidate management data having a transmission-confirmed flag with a value of 1.

The candidate managing unit 40 of the present embodiment holds, in response to the generation of image data based on a new encoding unit, new candidate data corresponding to the encoding unit in question in the server-side candidate holding unit 20, for example.

Further, the candidate managing unit 40 generates new candidate management data corresponding to the candidate data in question. Then, the candidate managing unit 40 stores the generated candidate management data in the candidate management data storing unit 22. Here, as the frame number of the candidate management data in question, the frame number of a frame image corresponding to the candidate management data in question is set. Here, in a case where the encoding unit is a slice, a number indicating the encoding order may be set in place of the frame number.

Further, as the frame format data of the candidate management data in question, a value indicating the frame format of the encoding unit corresponding to the candidate management data in question is set. For example, I is set for the value of frame format data in a case where an I-frame is obtained as a result of encoding, and P is set for the value of frame format data in a case where a P-frame is obtained as a result of encoding.

Further, a value of 0 is set for the transmission-confirmed flag of the candidate management data in question. After that, when the signal receiving unit 34 receives an acknowledgment indicating the success of reception of the image data corresponding to the candidate management data in question, the candidate managing unit 40 updates the value of the transmission-confirmed flag of the candidate management data in question to 1.

Further, the predetermined initial value is set for the transmission failure probability data of the candidate management data in question. After that, when the transmission failure probability estimating unit 38 estimates the transmission failure probability of the image data corresponding to the candidate management data in question, the candidate managing unit 40 updates the value of the transmission failure probability data of the candidate management data in question to the estimated transmission failure probability value.

Further, the candidate managing unit 40 determines, for each frame image, whether or not the frame image in question is an image immediately after a scene change as described above. Then, the candidate managing unit 40 sets a value based on the result of the determination in question to the value of the scene change flag of the candidate management data in question.

Further, a value of 0 is set for the reference count data of the candidate management data in question. The candidate managing unit 40 increases the value of the reference count data of the candidate management data in question by 1 every time the encoding unit corresponding to the candidate management data in question is referred to.

Further, the candidate managing unit 40 identifies, for the encoding unit corresponding to the candidate management data in question, the ratio of the number of coding unit blocks subjected to intra prediction coding to the number of coding unit blocks included in the encoding unit in question (intra prediction coding ratio). Then, a value indicating the identified intra prediction coding ratio is set for the value of the intra prediction coding ratio data of the candidate management data in question.

Further, as illustrated in FIG. 5, as the frame score data of the candidate management data in question, a value calculated in reference to the scene change flag value, reference count data value, and intra prediction coding ratio data value of the candidate management data in question is set. Further, as described above, for the candidate management data already stored in the candidate management data storing unit 22, the value of the frame score data is decreased every time new image data is generated.

Then, when the number of pieces of candidate data held in the server-side candidate holding unit 20 has reached the upper limit, as described above, the candidate managing unit 40 holds new candidate data in the server-side candidate holding unit 20 and deletes one of the pieces of candidate data held in the server-side candidate holding unit 20 from the server-side candidate holding unit 20.

For example, as described above, the candidate managing unit 40 deletes candidate data corresponding to candidate management data having the smallest frame score data value from the server-side candidate holding unit 20, for example. Further, the candidate managing unit 40 deletes the candidate management data in question from the candidate management data storing unit 22.

In this way, candidate data determined in reference to an intra prediction coding ratio may be deleted. Further, candidate data determined according to whether or not the frame image in question including an encoding unit is an image immediately after a scene change may be deleted. Further, candidate data determined according to the order in which encoding units have been encoded may be deleted. Further, candidate data determined according to the order in which encoding units have been referred to may be deleted.

Further, the candidate managing unit 40 performs control such that the terminal-side candidate holding unit 60 of the terminal 12 holds candidate data that is the copy of the candidate data held in the server-side candidate holding unit 20. Here, the candidate managing unit 40 may transmit, every time the candidate data held in the server-side candidate holding unit 20 is changed, an update notification indicating the change in question to the terminal 12, thereby synchronizing the candidate data held in the terminal-side candidate holding unit 60 (the copy of the candidate data held in the server-side candidate holding unit 20) with the candidate data held in the server-side candidate holding unit 20.

The referent determining unit 42 of the present embodiment determines, from encoding units related to transmitted image data, one or a plurality of referents that serve as the referents of a given encoding unit (for example, latest encoding unit), for example. The referent determining unit 42 may determine a referent in reference to the transmission failure probability of image data. Further, the referent determining unit 42 may determine a referent according to the degree of smallness of the data size of image data generated by referring to an encoding unit related to transmitted image data and encoding a given encoding unit. Further, the referent determining unit 42 may determine a referent from encoding units corresponding to the candidate data held in the server-side candidate holding unit 20.

The referent determining unit 42 calculates, as described above, the data size of image data generated by encoding a new encoding unit under the same QP conditions for each of the following cases, for example: (1) a case in which no other encoding unit is referred to, (2) a case in which a single encoding unit is referred to, and (3) a case in which a plurality of encoding units are referred to. Then, as illustrated in FIG. 6, the referent determining unit 42 determines a case corresponding to the encoding scheme of the given encoding unit according to the degree of smallness of the data size in question is, whether or not the referred-to encoding unit has been transmitted, or the transmission failure probability of the referred-to encoding unit.

In this case, the encoding processing unit 28 may encode the given encoding unit in question by referring to one or a plurality of referents corresponding to a case determined by the referent determining unit 42, thereby generating image data. For example, the encoding processing unit 28 may encode the given encoding unit in question by an encoding scheme corresponding to a case determined by the referent determining unit 42, and thereby generate image data.

The data receiving unit 50 of the present embodiment receives image data transmitted from the cloud server 10, for example.

The decoding processing unit 52 of the present embodiment decodes image data received by the data receiving unit 50, to generate an encoding unit, for example. The decoding processing unit 52 decodes image data by a decoding scheme paired with an encoding scheme corresponding to a case determined by the referent determining unit 42, for example.

The display control unit 54 of the present embodiment controls the display unit 12f of the terminal 12 to display encoding units generated by the decoding processing unit 52, for example.

The signal transmitting unit 56 of the present embodiment transmits, when the reception of image data has succeeded, a signal such as an acknowledgment indicating the success of the reception of the image data in question to the cloud server 10, for example.

The candidate synchronizing unit 58 of the present embodiment receives an update notification given by the candidate managing unit 40, for example. Further, the candidate synchronizing unit 58 changes the candidate data held in the terminal-side candidate holding unit 60, in accordance with the update notification in question. In this way, the candidate data held in the terminal 12 and the candidate data held in the cloud server 10 are synchronized with each other.

The terminal-side candidate holding unit 60 holds candidate data synchronized with the server-side candidate holding unit 20 as described above. The candidate data held in the terminal-side candidate holding unit 60 is used for decoding by the decoding processing unit 52.

Figure 9:
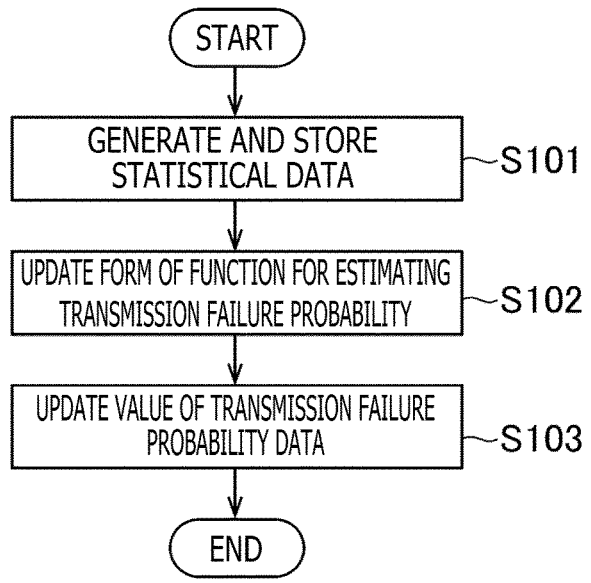
FIG. 9 is a flow chart illustrating an exemplary flow of processing that is performed in the cloud server according to the embodiment of the present invention.

Here, an exemplary flow of processing that is executed in the cloud server 10 according to the present embodiment when an acknowledgment has been received or when the predetermined timeout time has elapsed since the start of transmission of image data is described with reference to the flow chart of FIG. 9.

Further, the statistical data managing unit 36 generates new statistical data and stores the generated statistical data in the statistical data storing unit 24 (S101).

Then, the transmission failure probability estimating unit 38 updates the form of a function for estimating a transmission failure probability (S102).

Subsequently, the transmission failure probability estimating unit 38 updates, for each of the plurality of pieces of candidate management data stored in the candidate management data storing unit 22, the value of the transmission failure probability data included in the candidate management data in question (S103). The processing in this processing example then ends.

Figure 10:
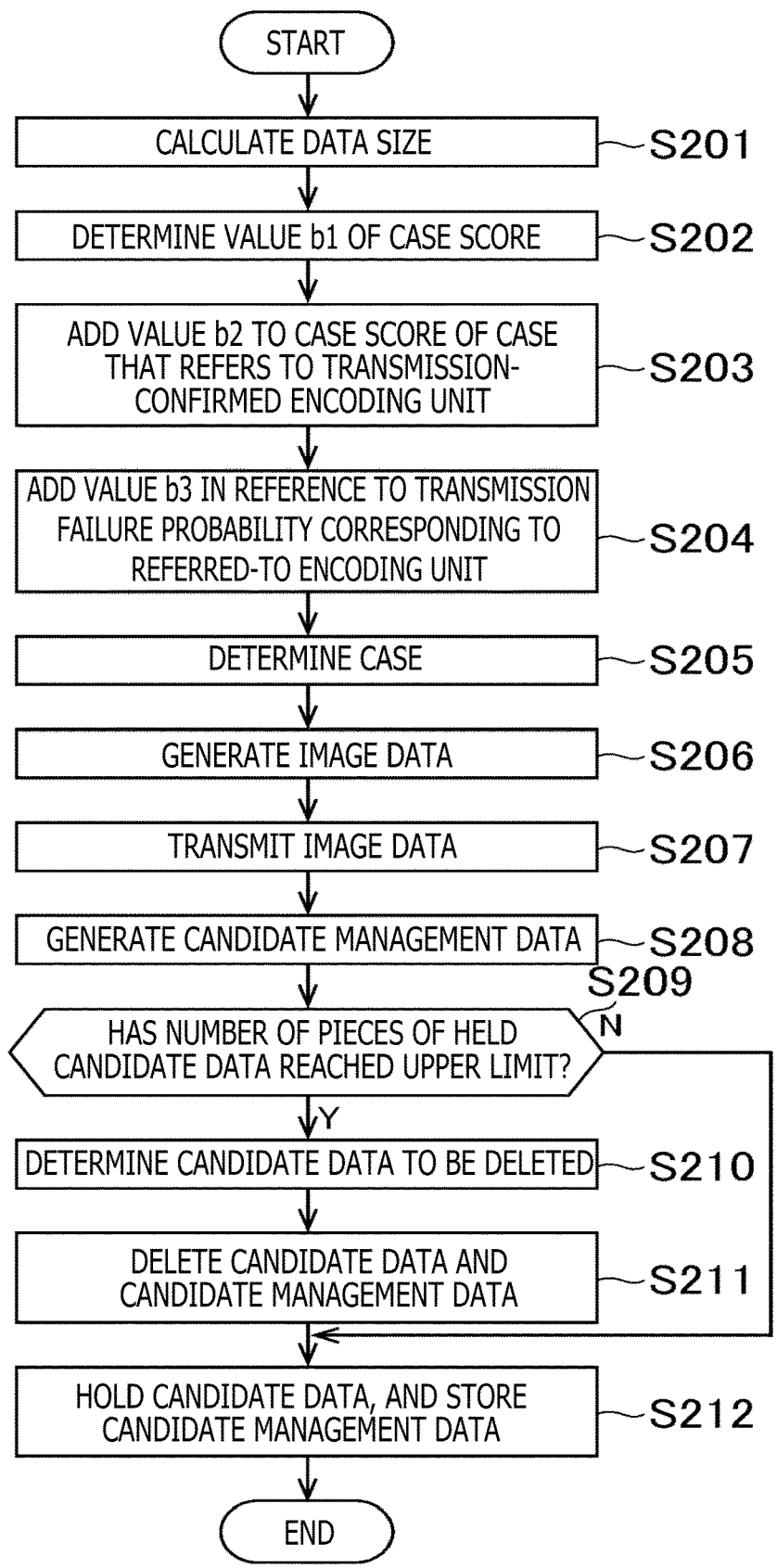
FIG. 10 is a flow chart illustrating an exemplary flow of processing that is performed in the cloud server according to the embodiment of the present invention.

Next, an exemplary flow of processing for the generation and transmission of image data based on an encoding unit that is executed in the cloud server 10 according to the present embodiment is described with reference to the flow chart of FIG. 10.

First, the referent determining unit 42 calculates, for each of the various cases as described above, the data size of image data generated by encoding the encoding unit in question under the same QP conditions (S201).

Next, the referent determining unit 42 determines, for each case, the value b1 of a case score corresponding to the data size calculated in the processing in S201 (S202).

Then, the referent determining unit 42 adds, for a case that refers to an encoding unit corresponding to candidate management data having a transmission-confirmed flag with a value of 1, the predetermined value b2 to the value of the case score (S203).

Subsequently, the referent determining unit 42 adds, for each case, the value b3 based on the value of the transmission failure probability data of candidate management data corresponding to the encoding unit referred to in the case in question to the value of the case score (S204).

Following this, the referent determining unit 42 determines a case corresponding to the encoding scheme of the encoding unit in question in reference to the value of the case score of each case (S205).

Then, the encoding processing unit 28 encodes the encoding unit in question by the encoding scheme corresponding to the case that has been determined in the processing in S205, and thereby generates new image data (S206).

Subsequently, the data transmitting unit 30 transmits the image data generated in the processing in S206 to the terminal 12 (S207).

Then, the candidate managing unit 40 generates candidate management data corresponding to the image data generated in the processing in S206 (S208).

Subsequently, the candidate managing unit 40 checks whether or not the number of pieces of candidate data held in the server-side candidate holding unit 20 has reached the predetermined upper limit (for example, 10) (S209).

In a case where the number of pieces of candidate data has reached the upper limit (S209: Y), the candidate managing unit 40 determines, in reference to the value of the frame score data included in the candidate management data, candidate data to be deleted (S210).

Then, the candidate managing unit 40 deletes the candidate data determined in the processing in S210 from the server-side candidate holding unit 20 and deletes candidate management data corresponding to the candidate data in question from the candidate management data storing unit 22 (S211). In this case, an update notification as described above is transmitted from the cloud server 10 to the terminal 12, and the corresponding candidate data is deleted from the terminal-side candidate holding unit 60.

When it is confirmed in the processing in S209 that the number of pieces of candidate data has not reached the predetermined upper limit (S209: N) or when the processing in S211 ends, the candidate managing unit 40 holds candidate data corresponding to the image data generated in the processing in S206, in the server-side candidate holding unit 20. Further, the candidate managing unit 40 stores the candidate management data generated in the processing in S208, in the candidate management data storing unit 22 (S212). The processing in this processing example then ends. In this case, an update notification as described above is transmitted from the cloud server 10 to the terminal 12, and the corresponding candidate data is held in the terminal-side candidate holding unit 60.

Figure 11:
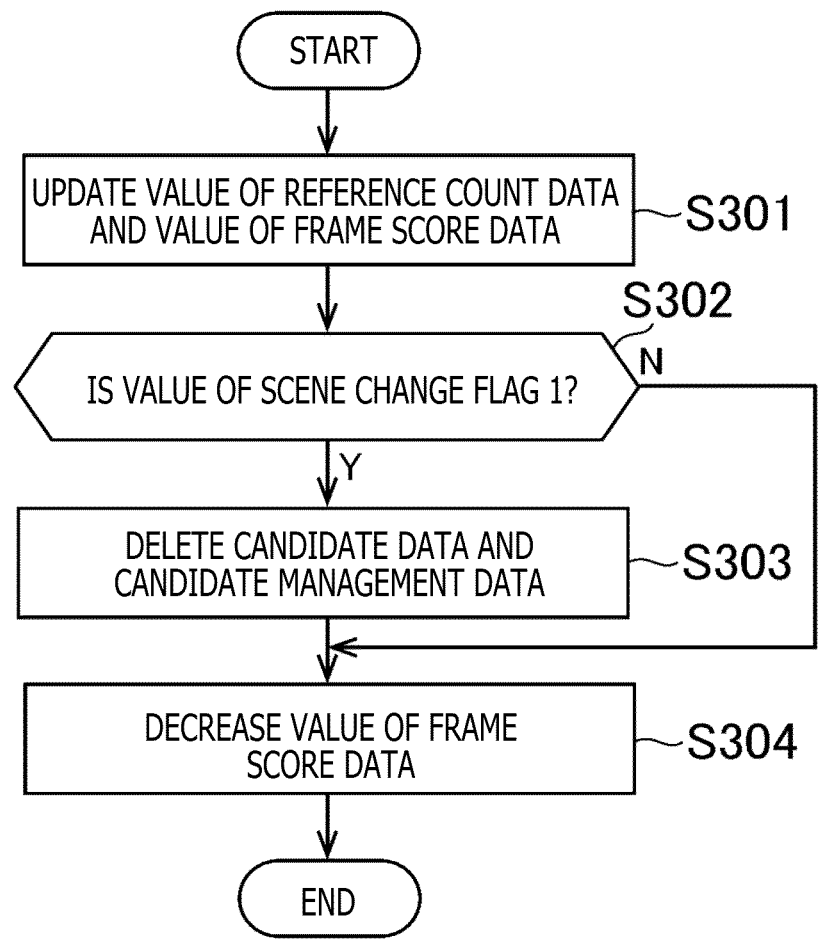
FIG. 11 is a flow chart illustrating an exemplary flow of processing that is performed in the cloud server according to the embodiment of the present invention.

Next, an exemplary flow of processing that is executed in the cloud server 10 according to the present embodiment in response to the generation of new candidate management data is described with reference to the flow chart of FIG. 11.

First, the candidate managing unit 40 increases, for candidate management data corresponding to the referent of an encoding unit related to image data corresponding to the candidate management data in question, the value of the reference count data by 1 and the value of the frame score data by the predetermined value a3 described above (S301).

Then, the candidate managing unit 40 checks whether or not the value of the scene change flag included in the candidate management data in question is 1 (S302).

In a case where the value is 1 (S302: Y), the candidate managing unit 40 deletes, from the server-side candidate holding unit 20, candidate data related to frames prior to a frame corresponding to the encoding unit related to the image data corresponding to the candidate management data in question. In this case, an update notification as described above is transmitted from the cloud server 10 to the terminal 12, and the corresponding candidate data is deleted from the terminal-side candidate holding unit 60. Further, the candidate managing unit 40 deletes candidate management data corresponding to the deleted candidate data from the candidate management data storing unit 22 (S303).

Then, the candidate managing unit 40 decreases, for candidate management data other than the candidate management data in question, the value of the frame score data by the predetermined value a5 described above (S304). The processing in this processing example then ends. Also in a case where it is confirmed in the processing in S302 that the value of the scene change flag included in the candidate management data is 0 (S302: N), the candidate managing unit 40 decreases, for the candidate management data other than the candidate management data in question, the value of the frame score data by the predetermined value a5 described above (S304). The processing in this processing example then ends.

In the processing in S302 of this processing example, whether or not the following conditions are met may be checked: the value of the scene change flag included in the candidate management data is 1 and the value of the intra prediction coding ratio data included in the candidate management data in question is larger than a value set in advance. Then, the processing in S303 and S304 may be executed in a case where it is confirmed that the conditions in question are met. Then, the processing in S304 may be executed without the processing in S303 being executed in a case where it is confirmed that the conditions in question are not met.

Further, in the present embodiment, the terminal-side candidate holding unit 60 may hold the number of frame images exceeding a predetermined number that is the upper limit in the server-side candidate holding unit 20 or candidate data that is image data generated in reference to the frame images in question. With this, even in a case where synchronization processing is in delay, the overflow of the terminal-side candidate holding unit 60 can be prevented.

Note that, the present invention is not limited to the embodiment described above.

For example, some functions implemented in the cloud server 10 may be implemented in the terminal 12.

Further, in the present embodiment, the upper limit of the number of pieces of candidate data held in the server-side candidate holding unit 20 may be variable instead of a predetermined value.

Further, the range of application of the present invention is not limited to the cloud gaming system 1. For example, the present invention is also applicable to a gaming system including a server installed at home and a terminal that is connected to the server in question via a home network, a public network, a cell phone carrier's network, or the like. That is, the computer network 14 may be a home network, a public network, a cell phone carrier's network, or the like. Further, the server in question and the terminal in question may be connected to each other in a wired or wireless manner.

Further, the types of video games to which the present invention is to be applied are not particularly limited to any type, and the present invention is also applicable to a gaming system configured to execute virtual reality (VR) or augmented reality (AR) games, for example.

Further, the range of application of the present invention is not limited to video games, and the present invention is applicable in general to a case where a transmission apparatus corresponding to the cloud server 10 described above transmits moving images.

Further, the above specific character strings and numerical values and the specific character strings and numerical values in the drawings are illustrative, and the present invention is not limited to those character strings and numerical values.

The invention claimed is:

1. A transmission apparatus comprising:
   circuitry configured to:
   sequentially acquire frame images drawn in a frame buffer;
   sequentially encode encoding units each corresponding to part or whole of one of the frame images and generate image data;
   sequentially transmit the image data;
   estimate, after the transmission of the image data, a transmission failure probability that is a probability of failure of the transmission of the image data; and
   determine, in reference to the transmission failure probability of the image data, one or a plurality of referents that serve as a referent of a given encoding unit, from among the encoding units related to the image data transmitted,
   wherein the circuitry encodes the given encoding unit by referring to the one or the plurality of referents, and thereby generates the image data, and
   the transmission failure probability is estimated using a number of response-waiting transactions, an effective bandwidth of a communication path for image data, and an elapsed time from a start of transmission of the image data to a current time.

2. The transmission apparatus according to claim 1, wherein the circuitry is configured to estimate the transmission failure probability in reference to the number of pieces of the image data transmitted for which a corresponding acknowledgment has not been received and a predetermined timeout time has not elapsed since the transmission.

3. The transmission apparatus according to claim 1, further comprising:
   a candidate holding circuitry configured to hold a plurality of pieces of candidate data corresponding to the encoding units related to the image data transmitted,
   wherein the circuitry is further configured to determine the one or the plurality of referents from among the encoding units corresponding to the candidate data.

4. The transmission apparatus according to claim 3, further comprising:
   a candidate managing circuitry configured to hold the candidate data in the candidate holding circuitry,
   wherein, when the number of the pieces of candidate data held in the candidate holding circuitry has reached an upper limit, the candidate managing circuitry holds new candidate data in the candidate holding circuitry and deletes one of the pieces of candidate data held in the candidate holding circuitry from the candidate holding circuitry.

5. The transmission apparatus according to claim 4, wherein the candidate managing circuitry deletes, from the candidate holding circuitry, the candidate data determined according to a ratio of the number of coding unit blocks subjected to intra prediction coding to the number of coding unit blocks included in one of the encoding units.

6. The transmission apparatus according to claim 4, wherein the candidate managing circuitry deletes, from the candidate holding circuitry, the candidate data determined according to whether or not each of the frame images including the encoding units is an image immediately after a scene change.

7. The transmission apparatus according to claim 4, wherein the candidate managing circuitry deletes, from the candidate holding circuitry, the candidate data determined according to an order in which the encoding units have been encoded.

8. The transmission apparatus according to claim 4, wherein the candidate managing circuitry deletes, from the candidate holding circuitry, the candidate data determined according to an order in which the encoding units have been referred to.

9. The transmission apparatus according to claim 4, wherein the candidate managing circuitry performs control such that a terminal that is a transmission destination of the image data holds the candidate data that is a copy of the candidate data held in the candidate holding circuitry.

10. The transmission apparatus according to claim 9, wherein the candidate managing circuitry transmits, every time the candidate data held in the candidate holding circuitry is changed, an update notification indicating the change to the terminal, thereby synchronizing the candidate data held in the terminal and the candidate data held in the candidate holding circuitry with each other.

11. The transmission apparatus according to claim 1, wherein the circuitry is further configured to determine the one or the plurality of referents according to a degree of smallness of a data size of the image data generated by referring to one of the encoding units related to the image data transmitted and encoding the given encoding unit.

12. A transmission method comprising:
a sequentially acquiring frame images drawn in a frame buffer;
a sequentially encoding encoding units each corresponding to part or whole of one of the frame images and generating image data;
a sequentially transmitting the image data;
a estimating, after the transmission of the image data, a transmission failure probability that is a probability of failure of the transmission of the image data; and
a determining, in reference to the transmission failure probability of the image data, one or a plurality of referents that serve as a referent of a given encoding unit, from among the encoding units related to the image data transmitted,
wherein, in the encoding, the given encoding unit is encoded by referring to the one or the plurality of referents, and the image data is thereby generated, and
the transmission failure probability is estimated using a number of response-waiting transactions, an effective bandwidth of a communication path for image data, and an elapsed time from a start of transmission of the image data to a current time.

13. A non-transitory computer-readable medium configured to, when programmed by circuitry, perform the following process:
sequentially acquiring frame images drawn in a frame buffer;
sequentially encoding encoding units each corresponding to part or whole of one of the frame images and generating image data;
sequentially transmitting the image data;
estimating, after the transmission of the image data, a transmission failure probability that is a probability of failure of the transmission of the image data; and
determining, in reference to the transmission failure probability of the image data, one or a plurality of referents that serve as a referent of a given encoding unit, from among the encoding units related to the image data transmitted,
wherein, in the encoding, the given encoding unit is encoded by referring to the one or the plurality of referents, and the image data is thereby generated, and
the transmission failure probability is estimated using a number of response-waiting transactions, an effective bandwidth of a communication path for image data, and an elapsed time from a start of transmission of the image data to a current time.

14. The non-transitory computer-readable medium according to claim 13, wherein the process further comprises:
storing a plurality of pieces of candidate data corresponding to the encoding units related to the image data transmitted in a candidate holding circuitry;
determining the one or the plurality of referents from among the encoding units corresponding to the candidate data; and
deleting, in the candidate holding circuitry, candidate data from among the plurality of pieces of candidate data in reference to a value of frame score, and
a value of frame score data is determined in reference to a value of a scene change flag, a value of reference count data, and a value of intra prediction coding ratio data.

15. The transmission method according to claim 12, wherein the number of response-waiting transactions corresponds to a number of pieces of image data for which the corresponding acknowledgements have not been received and a predetermined timeout time has not elapsed since the transmission.

16. The transmission method according to claim 12, further comprising:
storing a plurality of pieces of candidate data corresponding to the encoding units related to the image data transmitted in a candidate holding circuitry;
determining the one or the plurality of referents from among the encoding units corresponding to the candidate data; and
deleting, in the candidate holding circuitry, candidate data from among the plurality of pieces of candidate data in reference to a value of frame score data.

17. The transmission method according to claim 16, wherein a value of frame score data is determined in reference to a value of a scene change flag, a value of reference count data, and a value of intra prediction coding ratio data.

18. The transmission apparatus according to claim 1, wherein the number of response-waiting transactions corresponds to a number of pieces of image data for which the corresponding acknowledgements have not been received and a predetermined timeout time has not elapsed since the transmission.

19. The transmission apparatus according to claim 3, wherein the circuitry is further configured to delete, in the candidate holding circuitry, candidate data from among the plurality of pieces of candidate data in reference to a value of frame score data.

20. The transmission apparatus according to claim 19, wherein a value of frame score data is determined in reference to a value of a scene change flag, a value of reference count data, and a value of intra prediction coding ratio data.

* * * * *